(12) United States Patent
DeLuca et al.

(10) Patent No.: US 12,249,045 B2
(45) Date of Patent: Mar. 11, 2025

(54) RESOLVING OBFUSCATED SECTIONS OF AN IMAGE WITH SELECTIVELY CAPTURED NEW IMAGERY

(71) Applicant: International Business Machines Corporation, Armonk, NY (US)

(72) Inventors: Lisa Seacat DeLuca, Bozeman, MT (US); Rachel Kutok, Natick, MA (US); Andrew T. Penrose, Dublin (IE); Massimiliano Gallo, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 17/550,127

(22) Filed: Dec. 14, 2021

(65) Prior Publication Data

US 2023/0186445 A1    Jun. 15, 2023

(51) Int. Cl.
G06T 5/50 (2006.01)
G06N 20/00 (2019.01)
G06T 7/00 (2017.01)

(52) U.S. Cl.
CPC .............. *G06T 5/50* (2013.01); *G06N 20/00* (2019.01); *G06T 7/0002* (2013.01); *G06T 2207/20221* (2013.01); *G06T 2207/30192* (2013.01)

(58) Field of Classification Search
CPC .................... G06T 5/50; G06T 7/0002; G06T 2207/20221; G06T 2207/30192;

(Continued)

(56) References Cited

U.S. PATENT DOCUMENTS 8,098,934 B2 *  1/2012  Vincent ................... G01S 19/51
                                                        382/177
8,897,541 B2 * 11/2014  Weisenburger ........... G06T 7/73
                                                        382/113

(Continued)

FOREIGN PATENT DOCUMENTS

CA          3007184 C       10/2020
CA          3172928 A1 *    12/2021  ............. A24F 40/51

(Continued)

OTHER PUBLICATIONS

M. Altaweel, "Methods for Creating Cloud Free Satellite Imagery: Sentinel 2," GIS Lounge, Sep. 7, 2017, https://www.gislounge.com/methods-creating-cloud-free-satellite-imagery-sentinel-2/, 5 pages.

(Continued)

*Primary Examiner* — Mahendra R Patel
(74) *Attorney, Agent, or Firm* — Edell, Shapiro & Finnan, LLC

(57) ABSTRACT

In an embodiment of the present invention, imagery of a geographic area is received from an image capture system. The imagery includes an obscurity impeding visibility. A geographic region within the geographic area is determined corresponding to a location of the obscurity. The image capture system is requested to capture new imagery of the geographic region at a time determined based on information including weather patterns. The new imagery of the geographic region is combined with the imagery of the geographic area to produce resulting imagery resolving the obscurity.

17 Claims, 6 Drawing Sheets

(58) Field of Classification Search
CPC .............. G06T 5/77; G06T 2207/10032; G06T 2207/20081; G06T 2207/20084; G06T 2207/30184; G06N 20/00; G06N 3/084
USPC ......................................................... 382/100
See application file for complete search history.

(56) References Cited

U.S. PATENT DOCUMENTS

| | | | |
|---|---|---|---|
| 9,471,986 B2* | 10/2016 | Janky | G06V 20/10 |
| 9,721,181 B2 | 8/2017 | Guan et al. | |
| 10,650,188 B2* | 5/2020 | Kasina | G06N 3/045 |
| 11,645,819 B2* | 5/2023 | Jayaram | G06F 3/012 |
| | | | 345/633 |
| 12,008,744 B2* | 6/2024 | Peshlov | G06V 10/82 |
| 12,026,845 B2* | 7/2024 | Pardeshi | G06T 19/006 |
| 2005/0175253 A1 | 8/2005 | Li et al. | |
| 2011/0244919 A1* | 10/2011 | Aller | G06V 40/168 |
| | | | 382/165 |
| 2013/0308045 A1* | 11/2013 | Rhoads | H04N 23/74 |
| | | | 348/371 |
| 2017/0161584 A1* | 6/2017 | Guan | G06V 10/42 |
| 2018/0150677 A1* | 5/2018 | Aschenbeck | G06V 20/13 |
| 2020/0250428 A1* | 8/2020 | Ahmed | G06V 20/13 |
| 2021/0150182 A1 | 5/2021 | Bader | |
| 2021/0258350 A1* | 8/2021 | Buck | G06F 16/285 |
| 2022/0116709 A1* | 4/2022 | Hook | B60W 30/08 |
| 2023/0036694 A1* | 2/2023 | Coughlan | G06Q 20/385 |

FOREIGN PATENT DOCUMENTS

| | | | | |
|---|---|---|---|---|
| CN | 116547726 A | * | 8/2023 | ............. G06N 20/00 |
| WO | WO-2016097776 A1 | * | 6/2016 | |
| WO | 2020068744 A1 | | 4/2020 | |

OTHER PUBLICATIONS

R. Lo, "The Application of a Thresholding Technique in Cloud Motion Estimation From Satellite Observations", Feb. 28, 1975, IPCOM000151608D, 31 pages.

A. Meraner, et al., "Cloud removal in Sentinel-2 imagery using a deep residual neural network and SAR-optical data fusion", ISPRS Journal of Photogrammetry and Remote Sensing, vol. 166, Aug. 2020, pp. 333-346, 14 pages.

Seema Mahajan, et al., "Cloud detection methodologies: variants and development - a review", https://link.springer.com/article/10.1007/s40747-019-00128-0, Complex & Intelligent Systems (2020) 6:251-261, Dec. 14, 2019, 11 pages.

* cited by examiner

RESOLVING OBFUSCATED SECTIONS OF AN IMAGE WITH SELECTIVELY CAPTURED NEW IMAGERY

BACKGROUND

1. Technical Field

Present invention embodiments relate to image processing, and more specifically, to identifying obfuscated sections of imagery of a geographical area and capturing new imagery of the geographical area specific to the obfuscated sections to resolve obscurities.

2. Discussion of the Related Art

High resolution satellite imagery may be employed to identify vegetation (e.g., trees, shrubs, etc.) that is within a defined right of way of a linear asset and to estimate height of the identified vegetation. This information may be used to understand where to prioritize vegetation maintenance activities and, ultimately, may be provided to an enterprise asset management system or other work order tool to assign contractors to trim the vegetation in problematic areas. However, satellite imagery is expensive with costs incurred on a per mile basis. Further, there can be difficulties with respect to visibility in the satellite imagery of the underlying vegetation due to weather clouds covering the area of interest. Software vendors use symmetric differences to remove weather clouds from images by overlaying multiple images, stitching the images together, and removing the weather clouds. However, the removal of weather clouds introduces gaps in the resulting image, and there may be insufficient overlapping imagery to fill in all of the gaps in the resulting image created by the removal of the weather clouds.

SUMMARY

According to one embodiment of the present invention, a system for processing imagery to resolve obscurities comprises at least one processor. The system receives imagery of a geographic area from an image capture system. The imagery includes an obscurity impeding visibility. A geographic region within the geographic area is determined corresponding to a location of the obscurity. The system requests the image capture system to capture new imagery of the geographic region at a time determined based on information including weather patterns. The new imagery of the geographic region is combined with the imagery of the geographic area to produce resulting imagery resolving the obscurity. Embodiments of the present invention further include a method and computer program product for processing imagery to resolve obscurities in substantially the same manner described above.

BRIEF DESCRIPTION OF THE DRAWINGS

Generally, like reference numerals in the various figures are utilized to designate like components.

DETAILED DESCRIPTION

Figure 1:
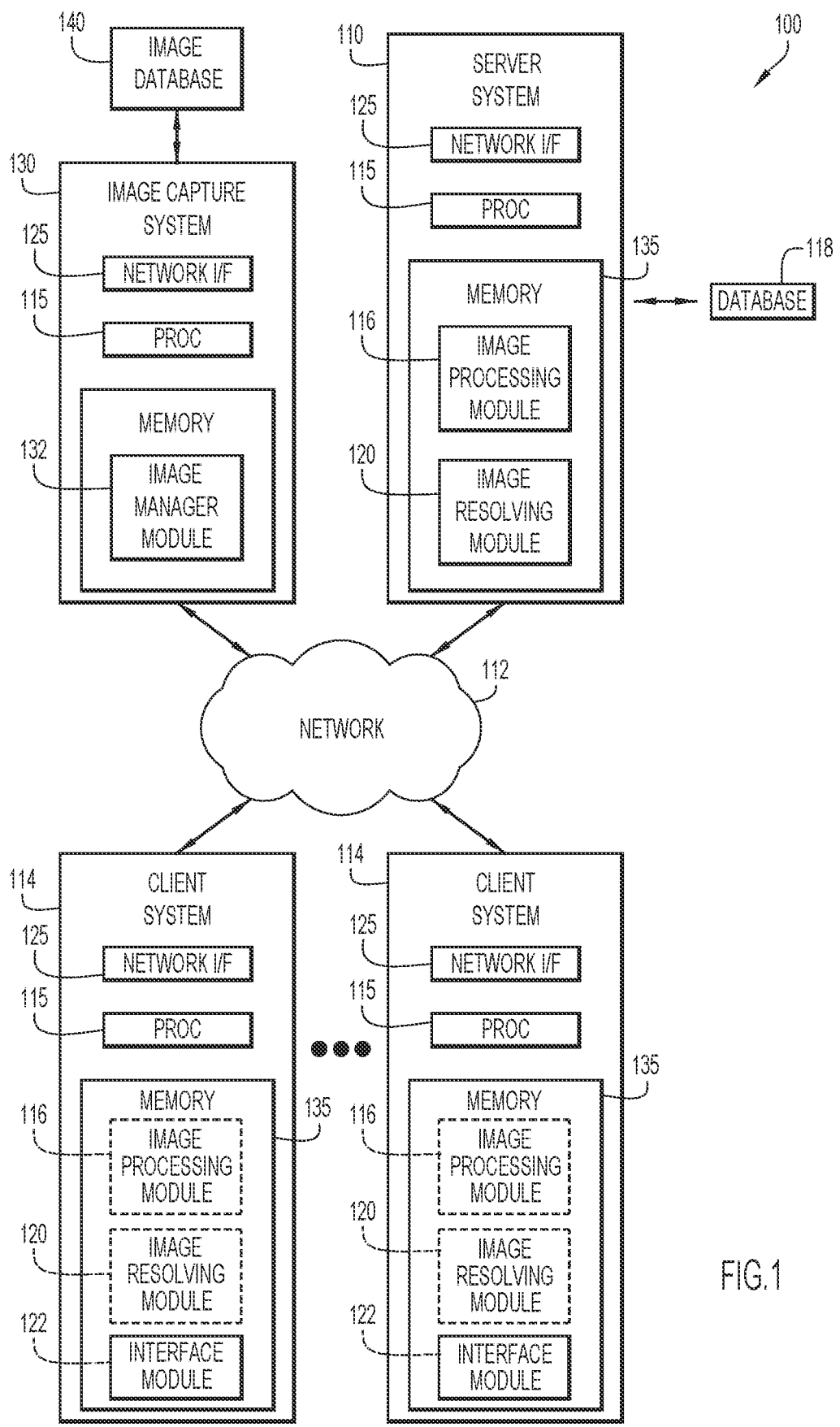
FIG. 1 is a diagrammatic illustration of an example computing environment according to an embodiment of the present invention.

High resolution satellite imagery may be employed to identify vegetation (e.g., trees, shrubs, etc.) or other objects within geographic areas. For example, the vegetation may be within a defined right of way of a linear asset. The satellite imagery may further be used to estimate height of the vegetation. However, there can be difficulties with respect to visibility in the satellite imagery of the underlying vegetation due to weather clouds covering the geographic area. Symmetric differences may be used to remove weather clouds from images by overlaying multiple images, stitching the images together, and removing the weather clouds. However, the removal of the weather clouds introduces data gaps in the resulting image, and there may be insufficient overlapping imagery to provide data to fill in all of the data gaps in the resulting image created by the removal of the weather clouds.

Present invention embodiments determine and use geographical coordinates of a geographical region corresponding to obfuscated sections of an image (e.g., sections of an image containing weather clouds or other obscurities, etc.) to request new imagery to resolve obscurities within the obfuscated sections. Present invention embodiments initially remove weather clouds or other obscurities from original imagery, and employ imagery from overlapping satellite passes to fill gaps in the original imagery where the weather clouds or other obscurities have been removed. However, there may be some gaps that remain for which no overlapping imagery exists. Accordingly, present invention embodiments determine geographic coordinates of geographical regions corresponding to the remaining gaps. The geographical coordinates are used to request capture of new imagery for the geographical regions corresponding to the remaining gaps in order to fill the remaining gaps in the imagery created by removal of the weather clouds or other obscurities.

Present invention embodiments provide several advantages. In particular, present invention embodiments remove obscurities from imagery of geographic areas that are unable to be removed from conventional image techniques. This is accomplished by focusing only on areas of the obscurities in the image, and overlaying or combining the new imagery with the original imagery to produce imagery without the obscurities. New imagery is requested for only those areas covering the obscurities (as opposed to an entire geographical area of the original imagery) to provide reduced image data, thereby increasing processing performance and rapidly providing resolved imagery.

Further, capture of the new imagery is controlled to increase a likelihood of the new imagery lacking obscurities by providing control information for capturing the new imagery (e.g., date and/or time, season, conditions, etc.). This improves processing performance by reducing requests for, and capture of, additional imagery for resolving the obscurities. The control information may be determined by machine learning models to optimize the likelihood of capturing new clean imagery for resolving obscurities.

An example environment 100 for use with present invention embodiments is illustrated in FIG. 1. Specifically, environment 100 includes one or more server systems 110, one or more client or end-user systems 114, and an image capture system 130. Server systems 110, client systems 114, and image capture system 130 may be remote from each other and communicate over a network 112. The network may be implemented by any number of any suitable communications media (e.g., wide area network (WAN), local area network (LAN), Internet, Intranet, etc.). Alternatively, server systems 110, client systems 114, and image capture system 130 may be local to each other, and communicate via any appropriate local communication medium (e.g., local area network (LAN), hardwire, wireless link, Intranet, etc.).

Client systems 114 enable users to submit requests to server systems 110 for imagery of a geographic area. The server systems include an image processing module 116 and an image resolving module 120. The image processing module receives and processes imagery from image capture system 130 to remove obscurities in the imagery. For example, the imagery may include satellite imagery of a geographic area with obfuscated image sections having obscurities or other anomalies (e.g., clouds or other weather elements, blurriness, etc.) hindering visibility of the geographic area. Image resolving module 120 resolves residual obscurities in the imagery (after processing by image processing module 116) by requesting new imagery from the image capture system for only the geographic regions corresponding to the residual obscurities (e.g., rather than re-capturing imagery for the entire geographic area).

A database system 118 may store various information for the image processing (e.g., geospatial library, masks, etc.). Database system 118 may be implemented by any conventional or other database or storage unit, may be local to or remote from server systems 110, client systems 114, and image capture system 130, and may communicate via any appropriate communication medium (e.g., local area network (LAN), wide area network (WAN), Internet, hardwire, wireless link, Intranet, etc.). The client systems may include an interface module 122 to present a graphical user (e.g., GUI, etc.) or other interface (e.g., command line prompts, menu screens, etc.) to solicit information from users pertaining to the desired imagery and analysis, and may provide reports including analysis results (e.g., resulting images, maps, obscurities, etc.).

Image capture system 130 provides imagery to requesting systems, such as server systems 110 and/or client systems 114. The image capture system is preferably an image capture system of a third party image provider. The image capture system includes an image manager module 132 to control an image capture device (e.g., satellite, camera, etc.) to capture images and to store the captured images in an image database system 140. The captured images are typically ordered chronologically in a time series. However, any desired imagery and corresponding image capture device may be used (e.g., light detection and ranging (Lidar), camera, satellite, etc.). Image database system 140 may store the captured images and various corresponding information (e.g., location coordinates of the geographic area captured by the image, time indicator or timestamp, cloud masks, region of interest masks, etc.). Image database system 140 may be implemented by any conventional or other database or storage unit, may be local to or remote from server systems 110, client systems 114, and image capture system 130, and may communicate via any appropriate communication medium (e.g., local area network (LAN), wide area network (WAN), Internet, hardwire, wireless link, Intranet, etc.).

Server systems 110, client systems 114, and image capture system 130 may be implemented by any conventional or other computer systems preferably equipped with a display or monitor, a base, optional input devices (e.g., a keyboard, mouse or other input device), and any software (e.g., conventional or other server/communications software; conventional or other browser software; image manager module 132; image processing module 116, image resolving module 120, and interface module 122 of present invention embodiments; etc.). The base may include at least one hardware processor 115 (e.g., microprocessor, controller, central processing unit (CPU), etc.), one or more memories 135 and/or internal or external network interfaces or communications devices 125 (e.g., modem, network cards, etc.).

Alternatively, one or more client systems 114 may receive and process images to remove obscurities when operating as a stand-alone unit. In a stand-alone mode of operation, the client system includes image processing module 116 and image resolving module 120. The image processing module receives and processes imagery from image capture system 130 to remove obscurities in the imagery. Image resolving module 120 resolves residual obscurities in the imagery (after processing by image processing module 116) by requesting new imagery from the image capture system for only the areas corresponding to the residual obscurities (e.g., rather than re-capturing imagery for the entire geographic area). The graphical user (e.g., GUI, etc.) or other interface (e.g., command line prompts, menu screens, etc.) provided by interface module 122 solicits information from a corresponding user pertaining to the desired imagery and analysis, and may provide reports including analysis results (e.g., resulting images, maps, obscurities, etc.).

The various modules of present invention embodiments (e.g., image processing module 116, image resolving module 120, interface module 122, etc.) may include one or more modules or units to perform the various functions of present invention embodiments described below. The various modules described herein (e.g., image processing module 116, image resolving module 120, interface module 122, image manager module 132, etc.) may be implemented by any combination of any quantity of software and/or hardware modules or units, and may reside within memory 135 of server systems 110, client systems 114, and/or image capture system 130 for execution by a corresponding processor 115.

Figure 2:
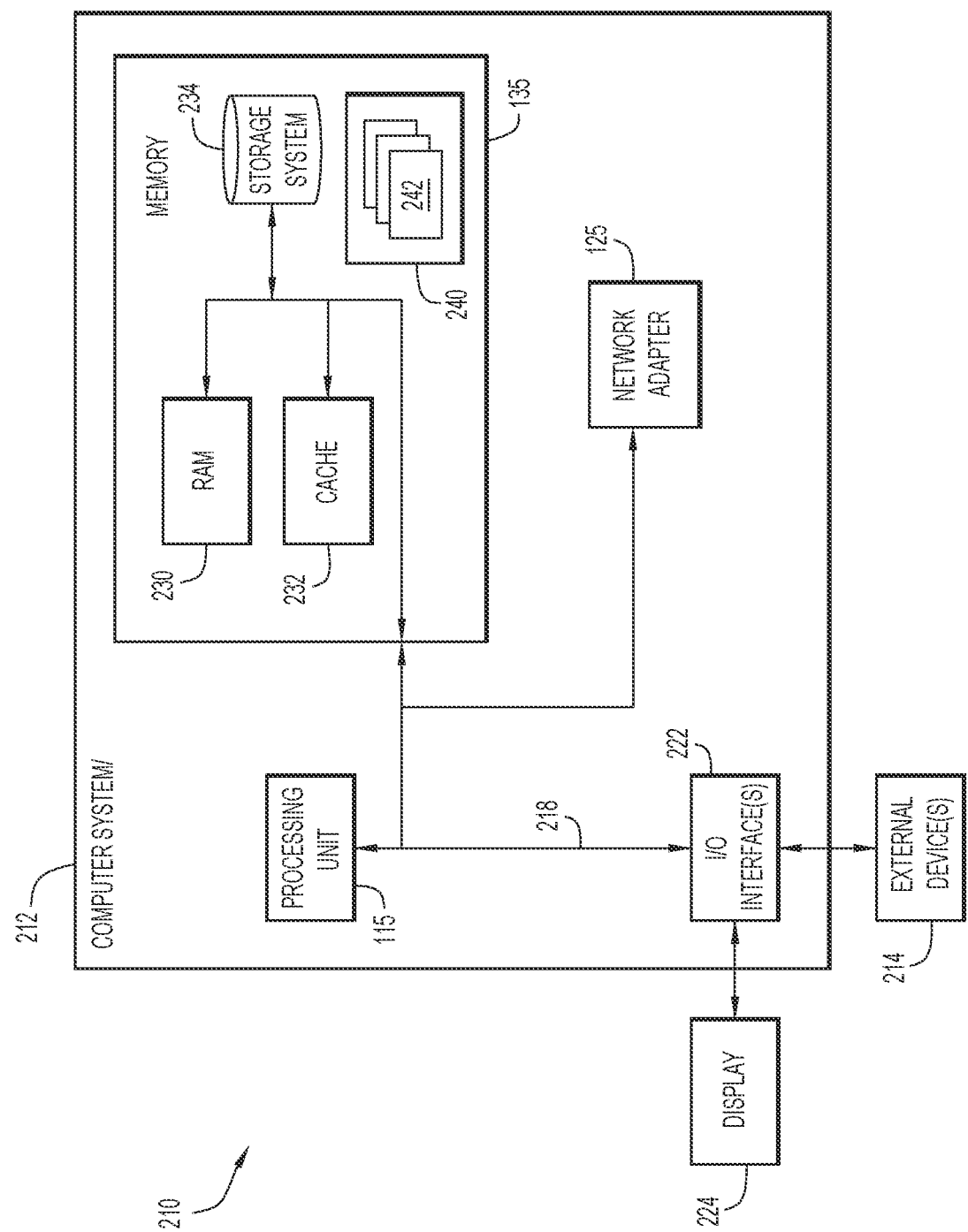
FIG. 2 is a block diagram of an example computing device according to an embodiment of the present invention.

Referring now to FIG. 2, a schematic of an example of a computing device 210 of computing environment 100 (e.g., implementing server system 110, client system 114, and/or image capture system 130) is shown. The computing device is only one example of a suitable computing device for computing environment 100 and is not intended to suggest any limitation as to the scope of use or functionality of embodiments of the invention described herein. Regardless, computing device 210 is capable of being implemented and/or performing any of the functionality set forth herein.

In computing device 210, there is a computer system 212 which is operational with numerous other general purpose or special purpose computing system environments or configurations. Examples of computing systems, environments, and/or configurations that may be suitable for use with computer system 212 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 212 may be described in the general context of computer system executable instructions, such as program modules, being executed by a computer system. Generally, program modules may include routines, programs, objects, components, logic, data structures, and so on that perform particular tasks or implement particular abstract data types.

As shown in FIG. 2, computer system 212 is shown in the form of a general-purpose computing device. The components of computer system 212 may include, but are not limited to, one or more processors or processing units 115, a system memory 135, and a bus 218 that couples various system components including system memory 135 to processor 115.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and it includes both volatile and non-volatile media, removable and non-removable media.

System memory 135 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 135 may include at least one program product having a set (e.g., at least one) of program modules that are configured to carry out the functions of embodiments of the invention.

Program/utility 240, having a set (at least one) of program modules 242 (e.g., image processing module 116, image resolving module 120, interface module 122, image manager module 132, etc.) may be stored in memory 135 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 125. As depicted, network adapter 125 communicates with the other components of computer system 212 via bus 218. It should be understood that although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3:
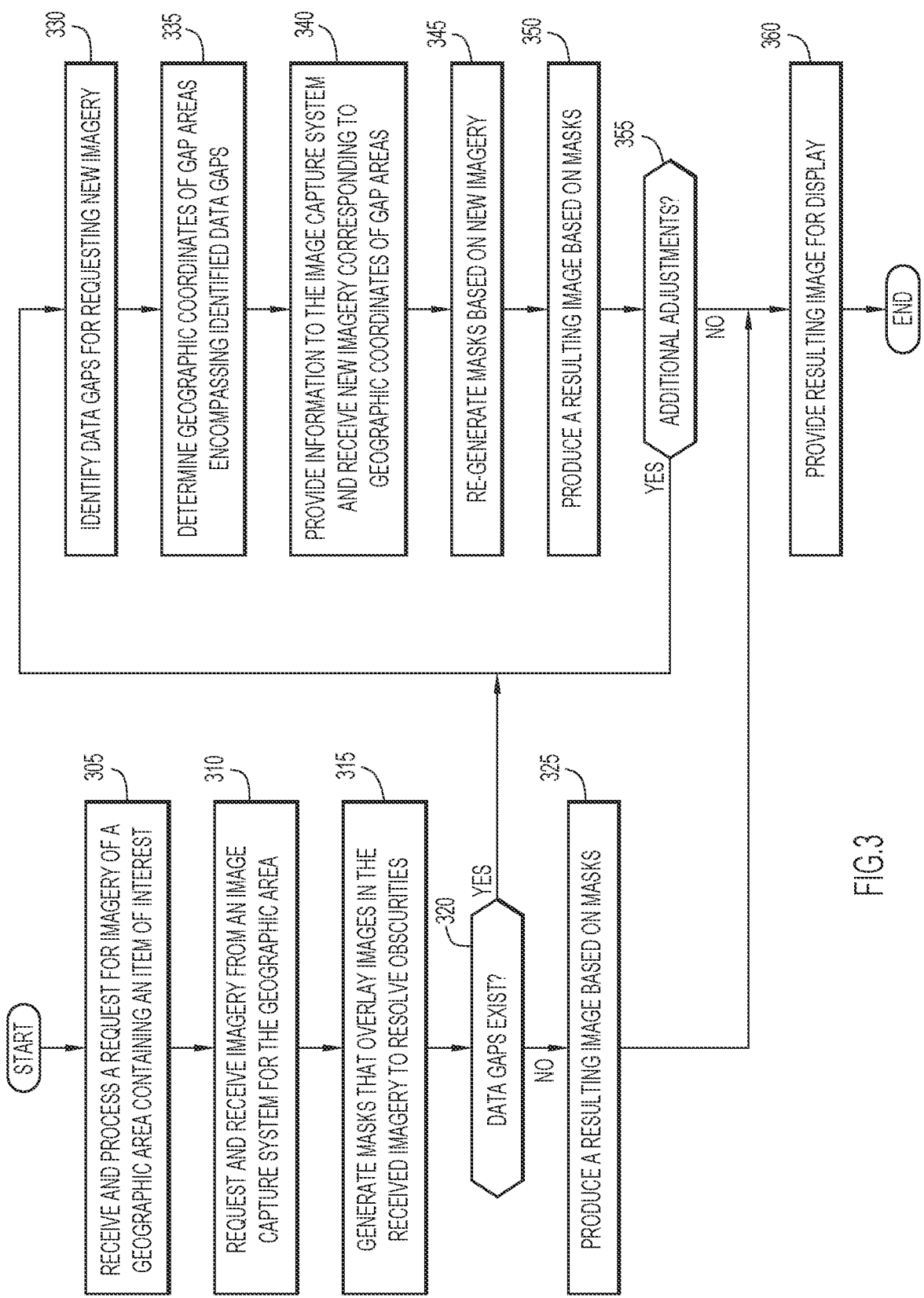
FIG. 3 is a procedural flowchart illustrating a manner of resolving obfuscated sections of imagery according to an embodiment of the present invention.

An example manner of resolving obscurities in imagery (e.g., via image processing module 116, image resolving module 120, and a server system 110 and/or a client system 114) according to an embodiment of the present invention is illustrated in FIG. 3. Initially, a request for imagery of a geographic area containing an object of interest is received by image processing module 116 of a server system 110 from interface module 122 of a client system 114 at operation 305. The request is processed by the image processing module to obtain the imagery from image capture system 130. The request may include geographic coordinates of the geographic area, while the imagery may be used to provide views of the object of interest and, optionally, an associated article in the vicinity of the object of interest. By way of example, an energy and utilities company may provide geographic coordinates of a geographic area containing power lines (as the object of interest) in order to request imagery of the power lines and view vegetation (as the associated article) near the power lines.

Image processing module 116 obtains the imagery from image capture system 130 at operation 310. Image manager module 132 of image capture system 130 processes a request from image processing module 116 (e.g., including the geographic coordinates of the geographic area, etc.) to capture and provide imagery of the geographic area. For example, the image manager module may provide controls to an image capture device to capture the imagery of the geographic area. Alternatively, the imagery of the geographic area may be retrieved from image database system 140 (FIG. 1) that stores recently captured images.

Image processing module 116 receives the imagery of the geographic area from image capture system 130, where the received imagery may include one or more sets of images each including at least one image corresponding to the geographic area. The images of the different image sets may include overlapping portions of the geographic area, and may be captured at different times. For example, images of different image sets may each include the geographic area and be captured at different times (e.g., different passes of the image capture device, etc.), and/or images of different image sets may each include portions of the geographic area but encompass different surrounding areas (e.g., an image may include a portion of the geographic area with adjoining or adjacent areas towards one direction, while another image may include a different portion of the geographic area and adjoining or adjacent areas towards another direction, etc.). The received imagery may include various information or metadata associated with the sets of images (e.g., scaling, resolution, geographical coordinates of a geographical region captured by an image, a time indication or timestamp, cloud masks indicating location of weather clouds in the image set, region of interest masks indicating a location of a region containing the object of interest within imagery of the geographic area, etc.).

Image processing module 116 processes the received imagery to generate masks that overlay images in the received imagery to identify and resolve one or more obfuscated image sections in the received imagery for the geographic area at operation 315. Each obfuscated image section includes one or more weather clouds or other obscurities. The obscurities in the imagery may include any objects or image characteristics that impede visibility of the object of interest (and/or associated article) in the received imagery of the geographic area (e.g., clouds or other weather elements at least partially blocking visibility, blurriness or other image attributes impeding visibility, trees, buildings, vehicles, animals, humans, etc.). The overlay of images enables data of images without obscurities to resolve corresponding areas with obscurities in other images of the received imagery. For example, an initial image may contain weather clouds impeding visibility of one or more underlying items (e.g., an object of interest and/or an associated article, etc.). However, another image (e.g., with geographic regions overlapping the initial image) may have been captured at a different time lacking weather clouds and providing clear visibility of the underlying items. The image data of the other overlapping image with clear visibility of the underlying items may be used to resolve the weather clouds in the initial image and provide a view of the underlying items.

The masks for overlaying images may be generated by any conventional or other techniques. For example, conventional techniques may be used to generate one or more non-overlapping region masks each corresponding to a non-overlapping region of the geographical area and collectively indicating locations of data gaps in the received imagery (e.g., locations in the received imagery for which there is insufficient overlapping image data to resolve weather clouds or other obscurities). By way of example, the non-overlapping region masks are described with respect to identification of data gaps with respect to obscurities in the form of weather clouds. However, the non-overlapping region masks may be configured for identifying data gaps with respect to other obscurities in substantially the same manner described below.

One or more region of interest masks and one or more cloud masks are obtained for images in the received imagery. Each cloud mask and region of interest mask may correspond to one or more images. For example, a cloud mask may indicate image pixels corresponding to weather clouds, while a region of interest mask indicates image pixels corresponding to a region of interest (e.g., geographical area containing the object of interest (and/or associated article)) within the received imagery. The region of interest mask identifies the object of interest (and/or associated article) in the received imagery since the received imagery may capture surrounding areas beyond the geographical area containing the object of interest.

The cloud mask may include binary or other values for each pixel (or group of pixels) to indicate whether that pixel (or group of pixels) belongs to weather clouds (e.g., a binary value of one may indicate a pixel corresponds to weather clouds, while a binary value of zero may indicate the pixel does not correspond to weather clouds, etc.). Similarly, the region of interest mask may include binary or other values for each pixel (or group of pixels) to indicate whether that pixel (or group of pixels) belongs to the region of interest (e.g., a binary value of one may indicate a pixel corresponds to a region of interest, while a binary value of zero may indicate the pixel does not correspond to the region of interest, etc.).

The cloud and region of interest masks may be provided by image capture system 130. Alternatively, image processing module 116 may generate these masks based on the received imagery. The weather clouds may be identified by the image processing module to produce cloud masks using any conventional or other image processing techniques. For example, image processing module 116 may employ machine learning models (e.g., neural networks, etc.) or other classifiers to process the received imagery and classify pixels as corresponding to or unassociated with weather clouds. The classifications may be used to generate cloud masks for corresponding images indicating the classification of each pixel of an image (e.g., corresponding to or unassociated with weather clouds).

A region of interest mask may be generated by image processing module 116 based on geographic coordinates of the geographic area containing the object of interest (e.g., the geographic coordinates provided in the request from client system 114). The geographic coordinates are used to determine pixels of the received imagery contained within the region of interest (or geographic area containing the object of interest and/or associated article) based on image metadata (e.g., resolution, geographic coordinates of the geographic region in image, scaling, etc.). The region of interest mask is generated for corresponding images indicating the status of each pixel of an image (e.g., included or excluded from the region of interest).

The cloud mask is combined with the region of interest mask for corresponding images to generate a cloud-free mask. The cloud and region of interest masks may be combined in any fashion (e.g., subtracted, etc.) to produce a cloud-free mask that indicates pixels in the region of interest that do not correspond to weather clouds. The cloud-free mask includes binary or other values for each pixel (or group of pixels) to indicate whether that pixel (or group of pixels) is within the region of interest and does not correspond to weather clouds (e.g., a binary value of one may indicate a pixel corresponds to the region of interest without weather clouds, while a binary value of zero may indicate the pixel corresponds to weather clouds or is outside of the region of interest, etc.). For example, a region of interest mask may include a binary value of one for a pixel of an image indicating inclusion in the region of interest, while a cloud mask may indicate a binary value of one for the pixel in the image indicating weather clouds. The subtraction of these values produces a binary value of zero for the pixel in the cloud-free mask effectively removing image data for that pixel (e.g., corresponding to the weather cloud in the region of interest). The cloud-free mask may be applied to corresponding images (e.g., the pixel values of the cloud free mask may be combined with values of corresponding pixels of the image data) to produce an image of the region of interest with data gaps (or no data) for locations of the weather clouds. In other words, image sections without weather clouds remain in the produced image, while image sections with weather clouds are removed from the produced image (thereby indicating the data gaps). The data gaps are formed by the cloud free mask effectively removing (e.g., zeroing, etc.) pixels of the region of interest containing weather clouds in the produced image. The cloud-free masks are preferably saved (e.g., in database system 118) as a cloud-free region geojson file.

Once the cloud-free masks are created, portions of the cloud-free masks corresponding to overlapping or intersecting areas in the region of interest are combined to generate non-overlapping region masks indicating non-overlapping areas within the region of interest without weather clouds in the received imagery. For example, the cloud-free masks indicate pixels in the region of interest that do not contain weather clouds as discussed above, and may correspond to overlapping geographic areas. The cloud-free masks may be combined (e.g., subtracted, etc.) at portions corresponding to the overlapping or intersecting areas to remove overlaps (or duplicated image data) and to enable images of the received imagery to be overlaid to resolve data gaps formed by weather clouds. The non-overlapping region masks collectively encompass the region of interest and indicate locations (or pixels) of the received imagery containing good data (lacking obscurities) and locations of data gaps.

By way of example, an initial cloud-free mask may correspond to an area of the region of interest and include binary values of one for pixels without weather clouds, while another cloud-free mask may include the same area and overlap with the initial cloud-free mask. The other cloud-free mask includes binary values of one for pixels without weather clouds in the overlapping area. The subtraction of these values for the overlapping area produces binary values of zero for the pixels of the overlapping area in the resulting non-overlapping region mask, thereby effectively removing the overlap or duplicated data (e.g., while retaining pixel values for remaining non-overlapping areas).

By way of further example, an initial cloud-free mask may include binary values of one for pixels in an area without weather clouds of the region of interest, while another cloud-free mask may include the same area and overlap with the initial cloud-free mask. The other-cloud-free mask includes binary values of one for pixels without weather clouds in the overlapping area and binary values of zero for pixels with weather clouds in the overlapping area. The subtraction of these values produces binary values of zero for the pixels without weather clouds in the resulting non-overlapping region mask, thereby effectively removing the overlap. However, the subtraction also produces binary values of one in the resulting non-overlapping region mask for the portion of the overlapping area in the other cloud-free mask with weather clouds, thereby effectively enabling the portion of the area without weather clouds of the initial cloud-free mask to fill in or resolve the corresponding portion of the area in the other cloud-free mask containing weather clouds.

Cloud-free masks associated with more recent imagery are given priority for performing the combining (e.g., cloud-free masks are used in chronological order of image data from the most recent until a threshold number of non-overlapping region masks is attained or removal of obscurities is completed). The non-overlapping region mask includes binary or other values for each pixel (or group of pixels) to indicate whether that pixel (or group of pixels) corresponds to weather clouds in a non-overlapping area within the region of interest.

The non-overlapping region masks correspond to different non-overlapping areas of the region of interest, and indicate locations in the areas with and without weather clouds. For example, the received imagery may not include sufficient image data to fill in or resolve all locations with weather clouds in the region of interest. Accordingly, the non-overlapping region masks may include data gaps (e.g., binary zero values for pixels, etc.) corresponding to sections of a non-overlapping area still containing weather clouds due to insufficient image data to resolve the obscurities (e.g., the received imagery does not include image data providing an unimpeded view of the obscured area). Accordingly, the locations of the data gaps indicated in the non-overlapping region masks identify the obfuscated image sections of the received imagery for adjustment. The non-overlapping region masks are preferably saved as geojson files (e.g., in database system 118).

The non-overlapping region masks may be applied to corresponding images (e.g., the pixel values of a non-overlapping region mask may be combined with values of corresponding pixels of the image data), where the resulting image portions are combined to provide imagery of geographic areas with largely unimpeded visibility. For example, the non-overlapping region masks may be applied to imagery of a geographic area containing power lines and vegetation to provide image data with largely unimpeded views of the vegetation. This image data may be provided to a model to determine tree heights relative to grass or other vegetation characteristics that may be problematic for the power lines (as opposed to providing a full image with clouded areas and overlapping areas, thereby significantly reducing processing time and conserving computing resources).

Figure 4B:
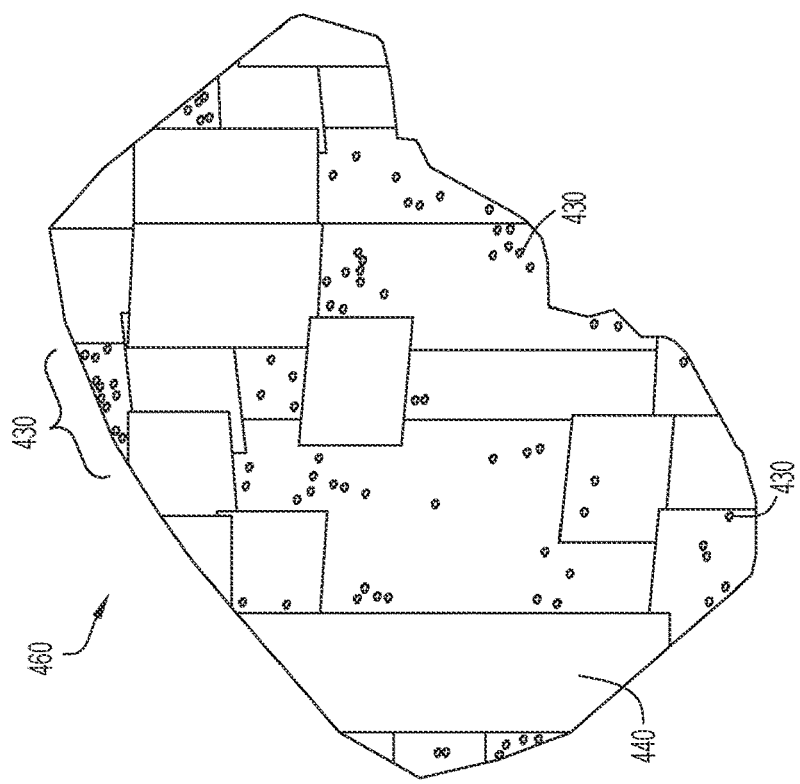
FIG. 4B is a schematic illustration of the example image of 4A with the obfuscated sections in the form of weather clouds partially resolved.
Figure 4A:
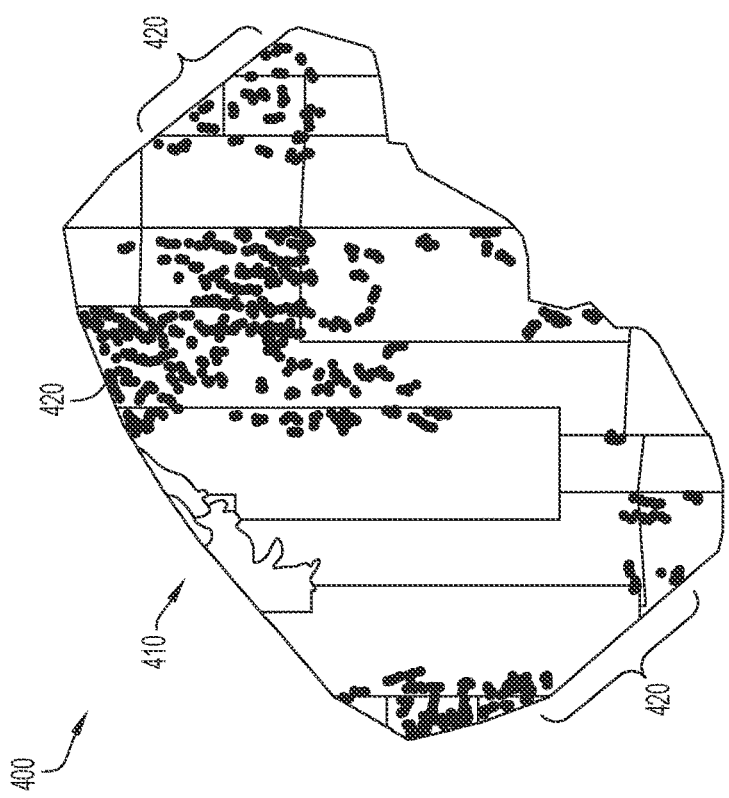
FIG. 4A is a schematic illustration of an example image of a geographic area with obfuscated sections in the form of weather clouds.

Referring to FIG. 4A, by way of example, an image 400 of a geographic region of interest 410 includes various sections of cloud cover (e.g., represented by patches 420 as viewed in FIG. 4A). Image processing module 116 may replace the image sections of weather clouds with corresponding sections from other images in order to produce a resulting image providing visibility for the geographic region underneath the weather clouds. The corresponding image sections may be determined based on the non-overlapping region masks as discussed above. For example, the non-overlapping region masks are applied to corresponding images (e.g., the pixel values of a non-overlapping region mask may be combined with values of corresponding pixels of the image data) and the resulting image portions combined to produce a resulting image of the region of interest. The resulting image is effectively a combination of overlaid images of the region of interest (e.g., which may be of different areas and/or may have been captured at different times).

An example of applying the non-overlapping region masks to image 400 is illustrated in FIG. 4B. In image 460 of FIG. 4B, the sections of weather clouds have been replaced with corresponding sections of other images by applying the non-overlapping region masks. The geographic region in image 460 is represented by a series of different tiles 440. A non-overlapping region mask may be associated with a tile 440 and used to provide image data for that tile.

Referring back to FIG. 3, image processing module 116 analyzes the non-overlapping region masks at operation 320 to determine existence of data gaps. The data gaps are indicated by the existence of locations in the non-overlapping region masks with pixel values indicating weather clouds or other obscurities for which insufficient image data exists to resolve the obscurities.

When no data gaps exist (e.g., indicating the obscurities have been resolved for the region of interest), a resulting image is produced at operation 325. For example, image processing module 116 may replace obfuscated image sections with corresponding sections from other images in the received imagery in order to produce a resulting image providing visibility for the region of interest. The corresponding sections may be determined based on the non-overlapping region masks. By way of example, the non-overlapping region masks are applied to corresponding images (e.g., the pixel values of a non-overlapping region mask may be combined with values of corresponding pixels of the image data) and the resulting image portions combined to produce a resulting image of the region of interest. The resulting image is effectively a combination of overlaid images of the region of interest (e.g., which may be of different areas and/or may have been captured at different times). The resulting image is provided to client system 114 at operation 360 for display in response to the request from the client system.

When data gaps exist in the non-overlapping region masks (e.g., indicating the presence of obscurities in the region of interest) as determined at operation 320, image resolving module 120 attempts to request new imagery from image capture system 130. For example, when there is an area in the region of interest that is very cloudy but has no overlapping images in the received imagery, new imagery is requested for that area. In particular, one or more data gaps for which new imagery is requested is determined at operation 330. Image resolving module 120 analyzes the non-overlapping region masks to determine locations of data gaps in the region of interest (or locations in the non-overlapping region masks with pixel values indicating weather clouds or other obscurities in the region of interest for which there is insufficient data to resolve the obscurities). Image resolving module 120 may apply geographic coordinates of the region of interest to the non-overlapping region masks to determine locations of pixels in the region of interest with values (e.g., binary zero, etc.) indicating the data gaps. Image data (or pixels) corresponding to each identified data gap is retrieved and processed to determine insufficiency of the image data. The insufficiency may be determined based on various analytics or metrics. For example, the analytics may include cloud (or other obscurity) cover percentage and quality of the image data (e.g., resolution, etc.) corresponding to an identified data gap. The cloud (or other obscurity) cover percentage may be determined from the image data based on a geographic area in the image data occupied by clouds (or other obscurity)/a geographic area of the image data. This may be calculated from the non-overlapping region masks (e.g., area of pixels indicating cloud cover (or obscurity)/areas of pixels of a region, etc.). The metrics may be compared to thresholds (e.g., percentage thresholds, resolution thresholds, etc.). When there is sufficient cloud (or other obscurity) cover and/or insufficient resolution for image data corresponding to a data gap, the data gap is identified for requesting new imagery.

Image resolving module 120 determines geographic coordinates of gap areas in the region of interest encompassing the identified data gaps at operation 335. The location of the identified data gaps may be ascertained from the non-overlapping region masks as described above. A gap area is defined that encompasses a geographic region corresponding to the data gap (e.g., a perimeter of the gap area surrounds the data gap or obscurity). The gap area encompasses a sub-region of the region of interest (or geographical area) which has a reduced area relative to the region of interest (or geographical area). The gap area may be of any shape. For example, the gap area may be polygonal, where coordinates of locations of the polygon (e.g., corners, midpoints of sides, polygon center or interior, etc.) defining the gap area are determined in order to request new imagery for the polygonal area. The coordinates may be based on a geospatial library and/or metadata of corresponding images (e.g., scaling, resolution, geographic coordinates of the geographic area of the image, etc.). By way of further example, the gap area may be circular, where geographic coordinates along a perimeter, or of a center point and a corresponding length of a radius or diameter may be determined to request new imagery for the circular gap area.

Image resolving module 120 requests image capture system 130 to provide new imagery of the gap areas at operation 340 (as opposed to new imagery for the region of interest or geographical area). The request may include the determined geographic coordinates and various information to control image capture of the geographic regions pertaining to the gap areas. The information may include a time for performing the image capture to provide a greater chance for the new imagery to lack weather clouds or other obscurities (e.g., date or date range, time of day or time range, season or seasonal range, etc.). For example, image resolving module 120 may consider various factors to propose a time for the image capture to avoid weather clouds or other obscurities (e.g., cloud cover or other items impeding visibility, etc.) including weather patterns (such as predicted weather in a region, historical weather in a region, and/or cloud coverage mapping and movement patterns), and/or season supplemental data for vegetation or other objects of interest (e.g., no leaves in winter, capture in spring/summer, etc.).

The time may be determined based on conventional or other weather models and/or various rules indicating a condition (e.g., objects, weather, etc.) and a corresponding time or time range for image capture. In addition, a machine learning model may be employed to determine a time or time range for image capture. The machine learning model may include any conventional or other machine learning models (e.g., mathematical/statistical, classifiers, feed-forward, recurrent or other neural networks, etc.). For example, neural networks may include an input layer, one or more intermediate layers (e.g., including any hidden layers), and an output layer. Each layer includes one or more neurons, where the input layer neurons receive input (e.g., context feature vectors), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks).

The weight (and bias) values may be adjusted based on various training techniques. For example, the machine learning may be performed with feature vectors of the training set as input (e.g., with features corresponding to an object of interest and/or geographic area and features corresponding to a predicted weather in a region, historical weather in a region, cloud coverage mapping and movement patterns, and/or season supplemental data) and corresponding time or time range as outputs, where the neural network attempts to produce the provided output (time or time range) and uses an error from the output (e.g., difference between produced and known outputs) to adjust weight (and bias) values (e.g., via backpropagation or other training techniques). The output layer of the neural network indicates a time or time range of the input data. By way of example, the output layer neurons may indicate a specific time or time range or an adjustment for a current time range. Further, output layer neurons may be associated with different times or time ranges and indicate a probability for the time or time range. The time or time range associated with the highest probability is preferably selected as the time or time range for the input data.

Once the machine learning model is trained, a feature vector (e.g., with features corresponding to an object of interest and/or geographic area and features corresponding to a predicted weather in a region, historical weather in a region, cloud coverage mapping and movement patterns, and/or season supplemental data) is provided to the trained machine learning model to produce a time or time range for image capture.

In addition, evidence of an obfuscated image section may be provided along with the request for new imagery to validate a potential refund or discounted new imagery. The evidence of an obfuscated section may include RGB (red/green/blue) pixel size or resolution, attributes of blurriness, and/or percentage of cloud cover (e.g., geographic area occupied by clouds/geographic area of image, etc.).

Image resolving module 120 may use an application programming interface (API) endpoint for requesting geographic regions for new image capture, and/or a geojson/geometry shapefile with details of the gap areas. Image manager module 132 of image capture system 130 processes the request to obtain and provide the new imagery. By way of example, the image manager module may provide controls to an image capture device to capture the new imagery according to the request. Alternatively, the new imagery may be retrieved from image database system 140 (FIG. 1) that stores recently captured images.

The new imagery is received by image resolving module 120. The new imagery may include one or more sets of images each including at least one image corresponding to the geographic region of a gap area. The images of the different image sets may be captured at different times. The new imagery may include various information or metadata associated with the sets of images (e.g., scaling, resolution, geographical coordinates of a geographical region captured by an image, a time indication or timestamp, cloud masks indicating location of weather clouds in the image set, region of interest masks indicating a location of a region corresponding to a gap area within the new imagery, etc.).

Image resolving module 120 re-generates the non-overlapping region masks based on the new imagery at operation 345 in substantially the same manner described above (e.g., for operation 315). For example, the region of interest pertains to a gap area for an identified data gap. One or more cloud masks and one or more region of interest masks for the new imagery may be provided by image capture system 130, or generated by image resolving module 120 in substantially the same manner described above. Each cloud mask and region of interest mask may correspond to one or more images of the new imagery. For example, a cloud mask may indicate image pixels corresponding to weather clouds, while a region of interest mask indicates image pixels corresponding to a region of interest (e.g., gap area containing an identified data gap) within the new imagery in substantially the same manner described above. The region of interest mask identifies the gap area in the new imagery since the new imagery may capture surrounding areas beyond the geographical region containing the gap area.

The cloud mask is combined with the region of interest mask for corresponding images of the new imagery to generate cloud-free masks in substantially the same manner described above. The cloud-free mask indicates whether a pixel (or group of pixels) is within the gap area and does not correspond to weather clouds. The cloud-free masks for the new imagery are preferably saved (e.g., in database system 118) as a cloud-free region geojson file.

Once the cloud-free masks for the new imagery are created, the cloud-free masks of the initially received imagery and new imagery are combined in substantially the same manner described above to re-generate the non-overlapping region masks. In particular, the portions of the cloud-free masks of the initially received and new imagery corresponding to overlapping or intersecting areas are combined to generate non-overlapping region masks indicating non-overlapping areas without weather clouds in the initially received and new imagery. The non-overlapping region masks overlay the new imagery with identified data gaps in the initially received imagery to fill in or resolve the identified data gaps (and corresponding obscurities) in substantially the same manner described above.

A resulting image is produced by image resolving module 120 at operation 350. For example, image resolving module 120 may replace obfuscated image sections of the initially received imagery with corresponding sections from images in the new imagery in order to produce a resulting image providing visibility for the region of interest containing the object of interest (and/or associated article). The corresponding sections may be determined based on the re-generated or updated non-overlapping region masks. By way of example, the non-overlapping region masks are applied to corresponding images (e.g., the pixel values of a non-overlapping region mask may be combined with values of corresponding pixels of the image data) and the resulting image portions combined to produce a resulting image of the region of interest. The resulting image is effectively a combination of overlaid images from the initially received and new imagery (e.g., which may be of different areas and/or may have been captured at different times).

Image resolving module 120 may determine to apply additional adjustments at operation 355. For example, improvement provided by the re-generated non-overlapping region masks may be tracked. By way of example, cloud (or other obscurity) cover percentage may be tracked (e.g., cloud (or other obscurity) area of the non-overlapping region mask/area covered by the non-overlapping region mask, etc.). When the cloud (or other obscurity) cover percentage remains above a percentage threshold, or succeeding images (or masks) do not sufficiently reduce the cloud (or other obscurity) cover percentage by a threshold amount (e.g., small or no improvement is being attained, etc.), additional adjustments are performed, and the process returns to operation 330 to identify remaining data gaps and request new imagery in substantially the same manner described above. In addition, image resolving module 120 may be limited to a number of requests for new imagery in order to limit costs, and may perform additional adjustments when requests for new imagery are available.

When additional adjustments are not needed for the resulting image as determined at operation 355, the resulting image is provided to client system 114 at operation 360 for display in response to the request from the client system. Any residual data gaps may be visible in the resulting image. In addition, a notification may be presented indicating that insufficient image data is present to resolve the residual data gaps.

Figure 5A:
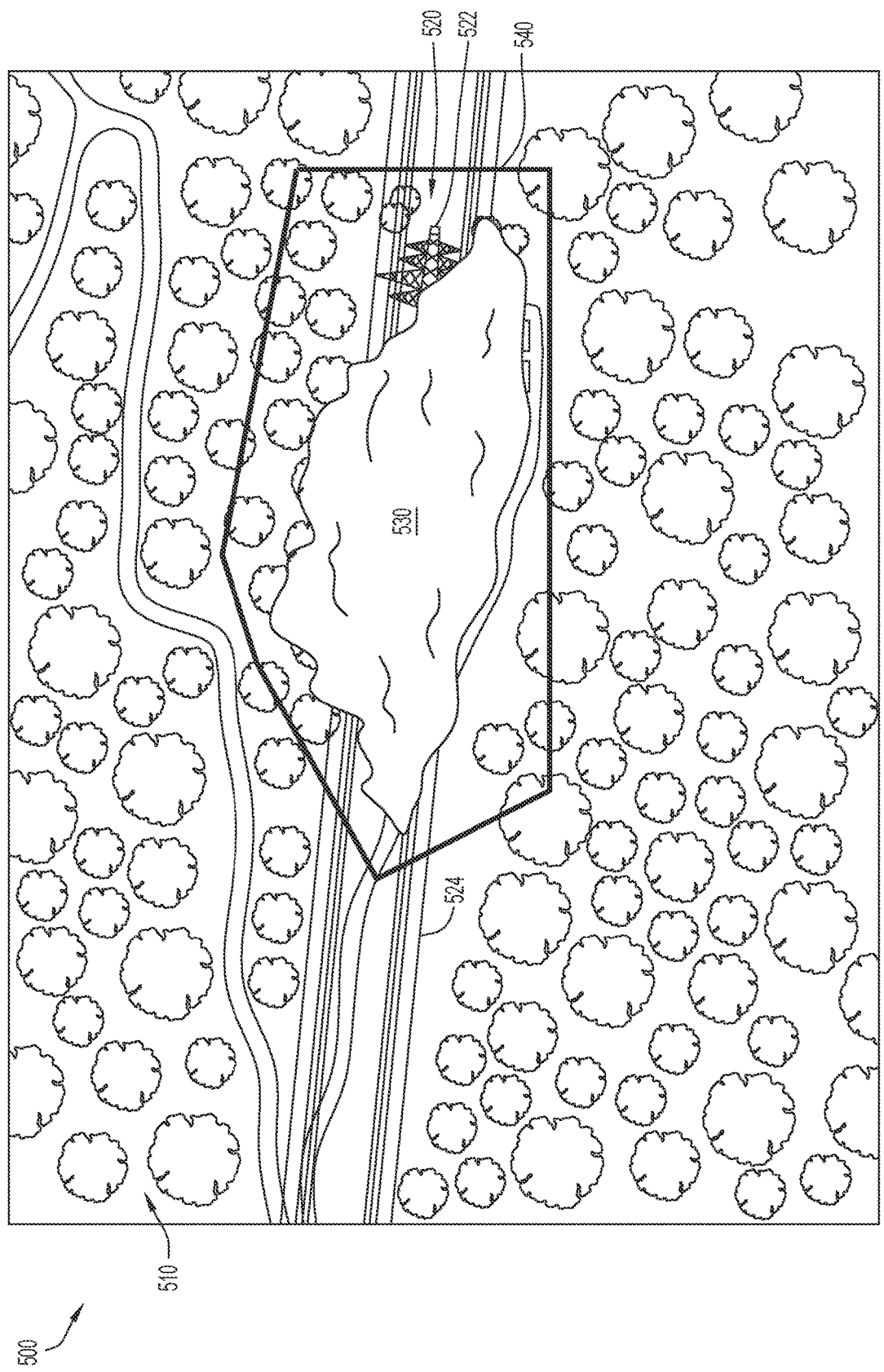
FIG. 5A is a schematic illustration of an example image of a geographic area with an obfuscated section in the form of weather clouds.

Example operation of an embodiment of the present invention is now described with reference to FIGS. 5A and 5B. Initially, an energy and utilities company provides geographic coordinates of an object of interest in the form of power lines. Satellite imagery for geographic areas overlapping linear miles of the power lines is captured. An example image 500 is illustrated in FIG. 5A. Image 500 pertains to a geographic area 510 corresponding to the geographic coordinates. As shown in image 500, geographic area 510 includes power equipment 520 including a tower 522 and corresponding power lines 524 extending through geographic area 510. By way of example, some visibility of power equipment 520 in image 500 is blocked by weather clouds 530. Despite applying a cloud mask imagery swapping technique to remove the weather clouds (e.g., non-overlapping region masks based on current imagery as described above), the area under the weather clouds containing vegetation is not clearly visible.

An embodiment of the present invention recognizes a data gap in image 500 produced by weather clouds 530. The geographic coordinates of the power lines may be overlaid with non-overlapping region masks produced for the imagery to identify the data gap (e.g., obfuscated image section for which there is insufficient image data to resolve the weather clouds). In other words, portions of the power lines may encompass locations in the non-overlapping region masks representing geographic areas for which there is an obscurity in the imagery and insufficient image data to resolve the obscurity. The image sections corresponding to these portions of the power lines contain the weather clouds and are unable to be resolved by the current imagery.

Figure 5B:
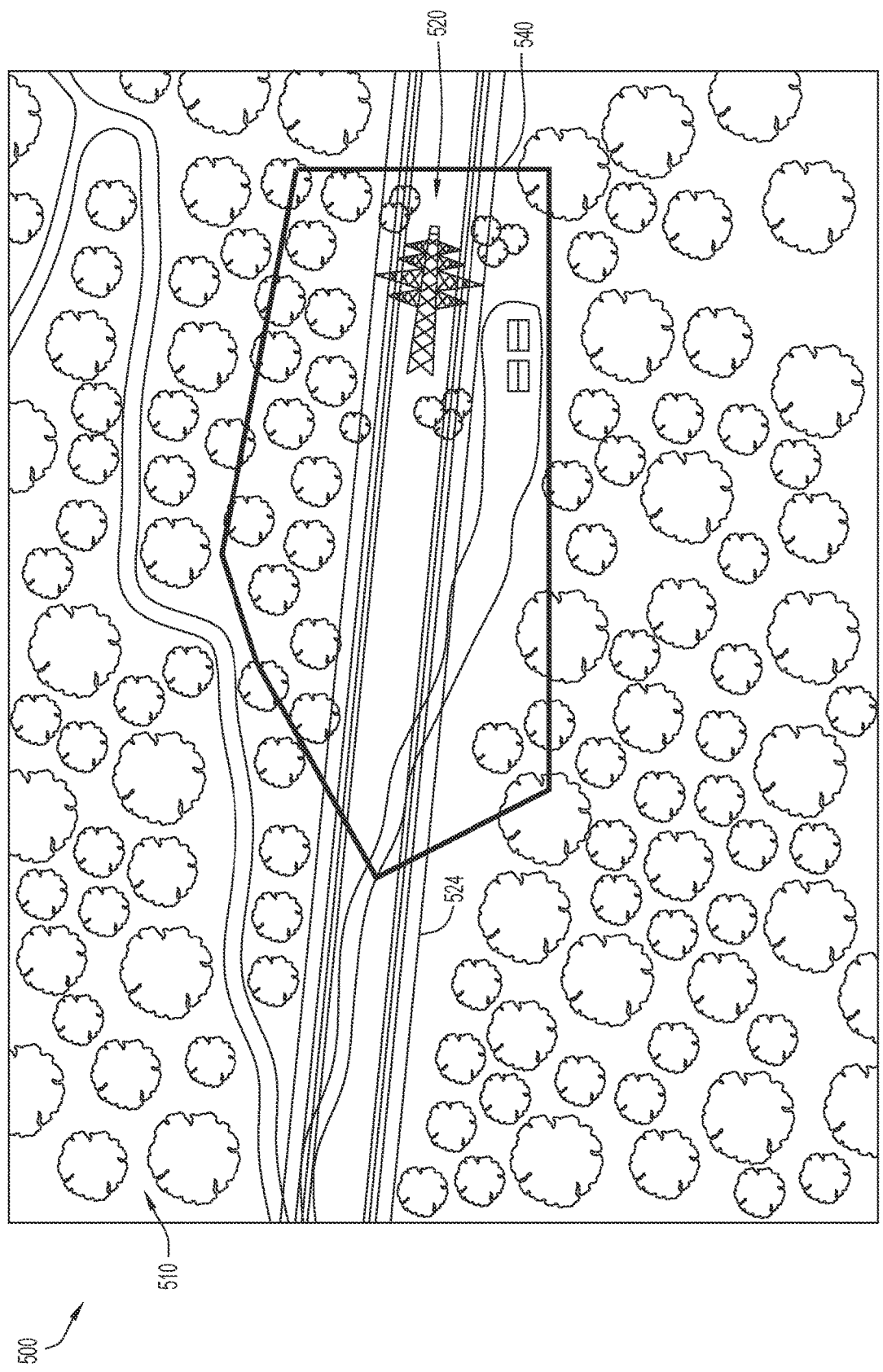
FIG. 5B is a schematic illustration of the example image of 5A after processing according to an embodiment of the present invention to resolve the obfuscated section and provide a view of the geographic area without the weather clouds.

Referring to FIG. 5B, an embodiment of the present invention resolves the data gap or obscurity. A geospatial polygon 540 is created around weather clouds 530 in image 500 representing affected geographic coordinates of geographic area 510 where visibility of the underlying vegetation is limited. Those geographic coordinates are sent to image capture system 130 to recapture imagery for only the geospatial polygon (as opposed to recapturing imagery for an entirety of geographic area 510). As shown in FIG. 5B, the recaptured imagery is clear and is used in image 500 to provide a resulting image without clouds 530. The resulting image shows a vegetation problem underneath the original cloud covered area that may be problematic for the energy and utilities company.

It will be appreciated that the embodiments described above and illustrated in the drawings represent only a few of the many ways of implementing embodiments for resolving obfuscated sections of an image with selectively captured new imagery.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., commercially available or custom browser software, communications software, and/or server software; image control module 132; image processing module 116, image resolving module 120, and interface module 122 of present invention embodiments; etc.). These systems may include any types of monitors and input devices (e.g., keyboard, mouse, voice recognition, etc.) to enter and/or view information.

It is to be understood that the software (e.g., image processing module 116, image resolving module 120, interface module 122, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. By way of example, image capture system 130 may include image processing module 116 and image resolving module 120. The image processing module may process imagery to remove obscurities in the imagery, while image resolving module 120 may resolve residual obscurities in the imagery (after processing by image processing module 116) by capturing new imagery for only the geographic regions corresponding to the residual obscurities (e.g., rather than re-capturing imagery for the entire geographic area) in substantially the same manner described above. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., image processing module 116, image resolving module 120, interface module 122, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., images, masks, geospatial library, etc.). The database systems may be implemented by any number of any conventional or other databases, data stores or storage structures (e.g., files, databases, data structures, data or other repositories, etc.) to store the information. The database systems may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information pertaining to the desired imagery and analysis (e.g., resulting images, maps, obscurities, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The report may include any information arranged in any fashion, and may be configurable based on rules or other criteria to provide desired information to a user including analysis results (e.g., resulting images, maps, obscurities, etc.).

The present invention embodiments are not limited to the specific tasks or algorithms described above, but may be utilized for resolving obscurities in any types of images (e.g., camera, satellite, Lidar, etc.) by selectively requesting new imagery.

The imagery may contain any quantity of any types of obscurities at any locations. The obscurities in the imagery may include any objects or image characteristics that impede visibility of an object of interest (and/or an associated article) in imagery of a geographic area (e.g., clouds or other weather elements at least partially blocking visibility, blurriness or other image attributes impeding visibility, trees, buildings, vehicles, animals, humans, etc.). The object of interest and associated article may be any objects in a geographic area (e.g., structures, vehicles, vegetation, people, animals, formations, utilities, etc.). The imagery may contain any associated information or metadata (e.g., scaling, resolution, geographical coordinates of a geographical region captured by an image, a time indication or timestamp, cloud masks indicating location of weather clouds in the imagery, region of interest masks indicating a location of a region containing the object of interest within imagery of the geographic area, etc.). The information may be used to determine locations or coordinates of items (e.g., data gaps or obscurities, gap areas, etc.) within the imagery or masks.

Present invention embodiments may employ any quantity of any types of masks (e.g., cloud, region of interest, cloud-free, non-overlapping region, etc.) or other structures to provide indications of corresponding image elements (e.g., pixels, etc.). The masks or other structures may be of any format, and may include any values for each element or group of elements (e.g., pixels, etc.) in an image to indicate any status (e.g., obscurity, region of interest, etc.). For example, a mask may include values for image elements in locations corresponding to locations in an image. Alternatively, a mask may include an indicator to correlate a pixel value in the mask with a pixel of an image. The masks may be combined with corresponding image data in any fashion (e.g., mathematical, logical, etc.) to produce a resulting image portion. By way of example, a mask may include binary values and be combined with a logical AND of image data. In this case, a binary value of zero in the mask removes (or zeroes) a corresponding image element in the image.

The non-overlapping region masks may be of any quantity, and correspond to any non-overlapping regions of imagery. Cloud-free or other masks may be combined in any fashion (e.g., mathematically, logically, priority based on chronological or other orders, etc.) to remove overlap (or duplicate data) and overlay imagery to produce the non-overlapping region masks collectively encompassing the region of interest (e.g., the region of interest is composed of the non-overlapping regions of the masks, etc.). The non-overlapping region masks may be used to produce image portions of corresponding non-overlapping regions that are combined to produce an image of the region of interest. Any conventional or other image processing techniques may be used to combine image portions of non-overlapping regions to produce a resulting image.

The gap areas may be of any size or shape (e.g., polygonal, circular, oval, etc.) to encompass a corresponding data gap or obscurity (e.g., a perimeter of the gap area surrounds the data gap or obscurity). The gap areas are preferably a sub-region of the region of interest (or geographical area) and have a reduced area relative to the region of interest (or graphical area). Any coordinates or other attributes may be used to define the gap area (e.g., coordinates or length along a perimeter, center or other interior point, etc.). The image data of the data gaps may be analyzed using any suitable analytics or metrics to determine use of new imagery (e.g., cloud or obscurity coverage percentage, data quality metrics (e.g., resolution, blurriness, etc.), percentage or amount of object of interest or associated article blocked, etc.).

The information to control image capture of the new imagery may include any information providing a time or other parameter (e.g., date or date range, time of day or time range, season or seasonal range, conditions, etc.). The information to control image capture of the new imagery may be based on any suitable factors (e.g., predicted weather in a region, historical weather in a region, cloud coverage mapping and movement patterns, season supplemental data for vegetation or other objects of interest (e.g., no leaves in winter, capture in spring/summer, etc.), etc.). The information to control image capture of the new imagery may be determined based on any rules of any format, and/or any machine learning models. The evidence may include any desired information indicating obscurities in imagery (e.g., RGB (red/green/blue) pixel size or resolution, attributes of blurriness, percentage of cloud (or obscurity) cover, etc.)).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of processing imagery to resolve obscurities, the method comprising:
   receiving, via a processor, imagery of a geographic area from an image capture system, wherein the imagery includes an obscurity impeding visibility;
   determining, via the processor, a geographic region within the geographic area corresponding to a location of the obscurity;
   determining, via the processor, one or more metrics of image data of the imagery corresponding to the obscurity, wherein the one or more metrics include a percentage of the image data covered by the obscurity;
   determining, via the processor, that the one or more metrics indicate data quality of the image data sufficient for requesting new imagery of the geographic region;
   requesting, via the processor, the image capture system to capture the new imagery of the geographic region at a time determined based on information including weather patterns; and
   combining, via the processor, the new imagery of the geographic region with the imagery of the geographic area to produce resulting imagery resolving the obscurity.

2. The method of claim 1, further comprising:
   identifying, via the processor, the location of the obscurity in the imagery based on a gap of data in the imagery.

3. The method of claim 1, wherein the obscurity includes weather clouds and the imagery lacks image data to resolve the obscurity.

4. The method of claim 1, further comprising:
   determining the time via a machine learning model trained with the weather patterns.

5. The method of claim 1, further comprising:
   generating, via the processor, evidence for requesting the new imagery to obtain a reduced cost for the new imagery, wherein the evidence includes the one or more metrics.

6. The method of claim 1, wherein the weather patterns include predicted weather in the geographic area, historical weather in the geographic area, and cloud coverage and movement patterns.

7. A system for processing imagery to resolve obscurities, the system comprising:
   at least one processor configured to:
      receive imagery of a geographic area from an image capture system, wherein the imagery includes an obscurity impeding visibility;
      determine a geographic region within the geographic area corresponding to a location of the obscurity;
      determine one or more metrics of image data of the imagery corresponding to the obscurity, wherein the one or more metrics include a percentage of the image data covered by the obscurity;
      determine that the one or more metrics indicate data quality of the image data sufficient for requesting new imagery of the geographic region;
      request the image capture system to capture the new imagery of the geographic region at a time determined based on information including weather patterns; and
      combine the new imagery of the geographic region with the imagery of the geographic area to produce resulting imagery resolving the obscurity.

8. The system of claim 7, wherein the at least one processor is further configured to:
   identify the location of the obscurity in the imagery based on a gap of data in the imagery.

9. The system of claim 7, wherein the obscurity includes weather clouds and the imagery lacks image data to resolve the obscurity.

10. The system of claim 7, wherein the at least one processor is further configured to:
    determine the time via a machine learning model trained with the weather patterns.

11. The system of claim 7, wherein the weather patterns include predicted weather in the geographic area, historical weather in the geographic area, and cloud coverage and movement patterns.

12. A computer program product for processing imagery to resolve obscurities, the computer program product comprising one or more non-transitory computer readable storage media having program instructions collectively stored on the one or more non-transitory computer readable storage media, the program instructions executable by a processor to cause the processor to:
    receive imagery of a geographic area from an image capture system, wherein the imagery includes an obscurity impeding visibility;
    determine a geographic region within the geographic area corresponding to a location of the obscurity;
    determine one or more metrics of image data of the imagery corresponding to the obscurity, wherein the one or more metrics include a percentage of the image data covered by the obscurity;
    determine that the one or more metrics indicate data quality of the image data sufficient for requesting new imagery of the geographic region;
    request the image capture system to capture the new imagery of the geographic region at a time determined based on information including weather patterns; and
    combine the new imagery of the geographic region with the imagery of the geographic area to produce resulting imagery resolving the obscurity.

13. The computer program product of claim 12, wherein the program instructions executable by the processor further cause the processor to:
    identify the location of the obscurity in the imagery based on a gap of data in the imagery.

14. The computer program product of claim 12, wherein the obscurity includes weather clouds and the imagery lacks image data to resolve the obscurity.

15. The computer program product of claim 12, wherein the program instructions executable by the processor further cause the processor to:
   determine the time via a machine learning model trained with the weather patterns.

16. The computer program product of claim 12, wherein the program instructions executable by the processor further cause the processor to:
   generate evidence for requesting the new imagery to obtain a reduced cost for the new imagery, wherein the evidence includes the one or more metrics.

17. The computer program product of claim 12, wherein the weather patterns include predicted weather in the geographic area, historical weather in the geographic area, and cloud coverage and movement patterns.

\* \* \* \* \*